United States Patent Office 3,269,202
Patented August 30, 1966

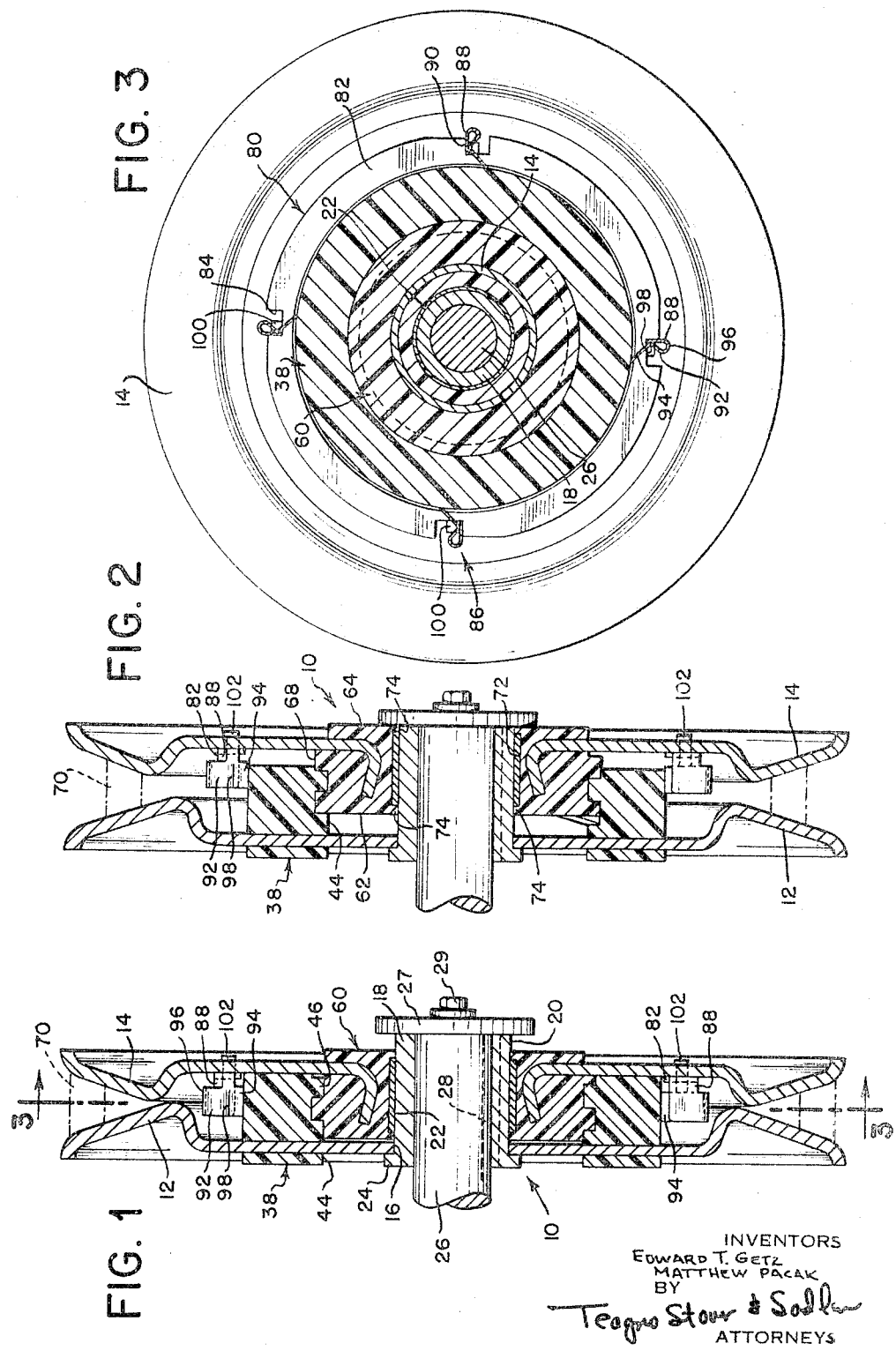

3,269,202
PULLEY APPARATUS
Edward T. Getz, Cleveland Heights, and Matthew Pacak, Solon, Ohio, assignors to Eaton Yale and Towne Inc., a corporation of Ohio
Filed Apr. 13, 1964, Ser. No. 359,172
16 Claims. (Cl. 74—230.17)

The present invention relates, generally, to torque transmitting devices of the pulley type.

More specifically, this invention relates to self-compensating torque transmitting pulley apparatus that is so constituted and arranged as to releasably substantially permanently automatically adjust for slippage occurring between the sheave halves thereof and the driving means engageable therewith, such slippage being due to increased loads imposed upon the said apparatus during its operation.

Heretofore, numerous self-compensating pulley apparatus have been suggested which utilize the basic principle of providing control means cooperable with the pulley. The control means, upon response to slippage or drag occurring at increased loads on the pulley, will attempt to reduce the distance between the sheave halves in an effort to increase the working or effective pitch diameter of the pulley. Accordingly, the function of the control means is to relieve the slack in the belt or similar driving means passing between the sheave halves. This application of a self-compensating pulley is particularly desirable in situations where it is necessary to take up slack or slippage in belt-type driving means extending between the sheave halves.

However, such self-compensating pulley apparatus as have heretofore been suggested are so constituted and arranged as to be particularly inefficient in performing the function of automatically compensating for the slack or slippage in belt-type driving means. This is particularly true when the use of a flexible belt as a driving means is extensive, variations in the loading applied thereto are continuous, and there occurs stretching or similar permanent deformation of the belt. Due to the inefficiency of such self-compensating pulley apparatus, the overall length of the belt is increased reducing tension therein and, accordingly, slippage between the sheave halves is suffered, thereby reducing the load-carrying capabilities of the pulley.

Moreover, little, if any, provision is made for maintaining the sheave hales of the pulley apparatus in the compensate position, even should there be found some semblence of efficiency in the performance of the function of such self-compensating apparatus.

In situations wherein such a load responsive automatically compensating pulley apparatus is used in a pulley system as either a drive or driven pulley in one sequence of operation and an idler pulley in another sequence of operation such provision must be made to retain the sheave halves of the pulley apparatus in compensated position during such idler sequence.

Thus, such inefficiency is compounded in that heretofore suggested self-compensating pulley apparatus are substantially, if not completely, incapable of maintaining proper tension in the driving means, especially during each and every one of the sequences of operation of a device with which the pulley apparatus is structurally operatively associated.

Accordingly, having in mind each and every one of the above disadvantages, and others that will be readily apparent to those skilled in the art, it is a primary object of the present invention to provide self-compensating torque transmitting apparatus that is so constituted and arranged as to releasably substantially permanently, automatically adjust for slippage occurring between the sheave halves thereof and the driving means engageable therewith, such slippage being due to increased loads imposed upon the said apparatus during its operation.

A further primary object of this invention is to provide self-compensating torque transmitting pulley apparatus comprising compensating means that is so constituted and arranged as to unusually efficiently automatically compensate for lengthening of belt-type driving means, said compensating means being further so constituted and arranged as to be releasably substantially permanently maintained in any one of a substantially infinite plurality of compensated positions.

Another primary object of the present invention is to provide self-compensating torque transmitting pulley apparatus comprising compensating means for unusually efficiently automatically compensating for lengthening of belt-drive driving means, said compensating means comprising a plurality of inserts so constituted and arranged as to be threadably rotatably mutually cooperatively engageable with one another, in combination with clutch means for releasably substantially permanently maintaining said compensating means in any one of a substantially infinite plurality of compensated positions.

Yet another primary object of this invention is to provide self-compensating torque transmitting pulley apparatus comprising compensating means for unusually efficiently automatically compensating for lengthening of belt-type driving means, said compensating means comprising a plurality of molded inserts so constituted and arranged as to be threadably rotatably mutually cooperatively engageable with one another, in combination with clutch means for releasably substantially permanently maintaining said compensating means in any one of a substantially infinite plurality of compensated positions, said clutch means being so constituted and arranged as to be continuously mutually cooperatively engageable with the periphery of one only of said plurality of inserts, enabling said one insert to be rotatably movable relative to another of said plurality of inserts in one of a plurality of directions only, and to be precluded from rotational movement in another of said plurality of directions.

Further, it is a primary object of the present invention to provide self-compensating torque transmitting pulley apparatus comprising compensating means for unusually efficiently automatically compensating for lengthening of belt-type driving means, said compensating means comprising a plurality of inserts, each one of which is moldingly structurally operatively associated with a corresponding one of a plurality of sheave halves, said inserts being so constituted and arranged as to be threadably rotatably mutually cooperatively engageable with one another, in combination with clutch means for releasably substantially permanently maintaining said compensating means in any one of a substantially infinite plurality of compensated positions, said clutch means being axially disposed medially of said sheave halves, and being so constituted and arranged as to be releasably mutually cooperatively engageable with the periphery of one only of said plurality of inserts, enabling said one insert to be rotatably movable relative to another of said plurality of inserts in one of a plurality of directions only, and to be precluded from rotational movement in another of said plurality of directions.

Still further, it is a primary object of this invention to provide self-compensating torque transmitting pulley apparatus comprising compensating means for unusually efficiently automatically compensating for lengthening of belt-type driving means, said compensating means comprising a plurality of molded inserts so constituted and arranged as to be threadably rotatably mutually cooperatively engageable with one another, the improvement comprising clutch means for releasably substantially permanently maintaining said compensating means in any one of a substantially infinite plurality of compensated positions, said clutch means being so constituted and arranged as to be mutually cooperatively engageable with the periphery of one only of said plurality of inserts, enabling said one insert to be rotatably moveable relative to another of said plurality of inserts in one of plurality of directions only, and to be precluded from rotational movement in another of said plurality of directions.

Still another primary object of the present invention is to provide self-compensating torque transmitting pulley apparatus comprising compensating means for unusually efficiently, automatically compensating for lengthening of belt-type driving means, the improvement comprising clutch means for releasably, substantially permanently maintaining said compensating means in any one of a substantially infinite plurality of compensated positions.

Other objects and important features of the invention will be apparent from a study of the specification following taken with their drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGURE 1 is a sectional view of self-compensating torque transmitting pulley apparatus, constructed in accordance with the principles of the present invention, and illustrating certain component parts in one of a substantially infinite plurality of positions;

FIGURE 2 is a view similar to FIGURE 1, but illustrating said component parts in another of said plurality of positions; and FIGURE 3 is a cross-sectional view taken along the line 3—3 of FIGURE 1.

This application discloses pulley apparatus that is an improvement of the pulley apparatus disclosed in copending application Serial No. 307,983, filed September 10, 1963, now Patent No. 3,196,702, issued July 27, 1965, and entitled "Pulley Apparatus."

Referring now to the drawing, there is illustrated therein a self-compensating or automatically compensating torque transmitting pulley apparatus 10, constructed in accordance with the principles of the present invention, and comprising a plurality of sheave halves 12 and 14.

The sheave half 12 is provided with a generally centrally disposed annular or circular opening or aperture 16. An axially extending annular or generally cylindrical hub portion 18 is disposed within the opening 16 and non-rotatably secured therewithin with respect to the sheave half 12, in any suitable manner, as by press-fitting, staking, or any other suitable operation. The hub portion 18 has a bearing surface 20 extending completely annularly about the external or exterior periphery thereof with the bearing surface 20 being rotatably mutually cooperatively engageable with an annular or generally cylindrical bushing 22. The bushing 22 completely annularly encompasses the hub portion 18 substantially throughout the longitudinal dimensional extent thereof in order to define a substantial bearing surface therebetween.

The hub portion 18 comprises a radially outwardly extending generally annularly configured flange portion 24 at one end thereof that is mutually cooperatively engageable with one end of the hub portion 18 in order to predetermine the position of the sheave half 12 with respect to the hub portion 18. In addition to being generally cylindrical, the hub portion 18 is of tubular configuration and non-rotatably structurally operatively associated with a shaft 26. To this end, the hub portion 18 and the shaft 26 are each provided with splines 28, with the hub portion being definitively positioned with respect to the end of the shaft in any suitable and conventional manner, as by means of a washer 27 and retaining fastener 29. It is to be understood that the washer 27 not only definitively or fixedly positions the hub portion 18 with respect to the end of the shaft 26, but additionally limits axial movement of the sheave half 14 with respect to the sheave half 12. Of course, any other suitable means for non-rotatably connecting the hub portion 18 to the shaft 26 may be used, such as a key arrangement, press-fit, or the like. The shaft 26 provides a power input for the apparatus 10, as by means of a suitable motor of conventional construction (not shown), or may provide a power output from the apparatus 10 to any desired location of use (also not shown).

An insert 38 is non-rotatably mutually cooperatively engageable and structurally operatively associated with the sheave half 12. The insert 38 may be fabricated of any suitable material, such as a plastic, and preferably is fabricated of nylon. In this manner, the insert 38 can be subjected to a suitable molding process so that the portions of the plasticized or synthetic material of the insert flows through slots (not shown) of the sheave half 12. Thus, the insert 38 is formed on both sides of the sheave half 12. Stated in other words, the insert 38 completely encompasses a substantial portion of the sheave half 12 axially thereof, that is, in a direction axially of the sheave half or along the longitudinal axis of the hub portion 18, and radially thereof, that is, in a direction generally perpendicularly disposed with respect to the aforementioned axis, and completely annularly thereabout. In accordance with this construction, the insert 38 is rigidly keyed, that is, mutually cooperatively engageable and structurally operatively associated, to the sheave half 12 for conjoint rotation therewith.

The insert 38 is further provided with a generally centrally disposed bore 44 which extends completely therethrough and the bore 44 may have an interiorly threaded portion 46 for a purpose to be described hereinafter.

An insert 60 is provided which is non-rotatably mutually cooperatively engageable and structurally operatively associated with the sheave half 14. The insert 60 may be fabricated of any suitable material, such as a plastic, and preferably is fabricated of nylon, as is the insert 38. In this manner, the insert 60 may be subjected to a suitable molding process to enable portions of the plasticized or synthetic material from which the insert 60 is fabricated to flow through slots (not shown), extending through the sheave half 14, and an opening (not shown) disposed centrally of the sheave half.

It will be understood that the insert 60, therefore, comprises a front face 62 and a rear face 64 disposed in generally parallel relationship with respect to the front 62, so that the insert 60 is formed on both sides of the sheave half 14. Stated in other words, the insert 60 completely encompasses a substantial portion of the sheave half 14 axially thereof, that is, in a direction axially of the sheave half 14 or along the longitudinal axis of the hub portion 18, and radially thereof, that is, in a direction generally perpendicularly disposed with respect to the aforementioned axis, and completely annularly thereabout. In accordance with this construction, the insert 60 is rigidly keyed, that is, mutually cooperatively engageable and structurally operatively associated, to the sheave half 14 for conjoint rotation therewith. Relative movement between the insert 60 and the sheave half 14 is precluded since cooling the material from which the insert 60 is formed subsequent to forming the insert 60 upon the sheave half shrinks the same, resulting in a good snug fit.

The insert 60 may further be provided with an exteriorly threaded portion 68 that extends completely annularly about the periphery thereof. The thread portion 68 is mutually cooperatively engageable with the threaded portion 46 of the insert 38, as will be more fully described and disclosed hereinafter.

As pointed out above, the bushing 22 completely annularly encompasses the hub portion 18. More specifically, the bushing 22 is rotatably mutually cooperatively engageable with the hub portion 18 and, to this end, the bushing 22 is non-rotatably secured to the insert 60, as by means of a press-fit within a bore 72, disposed generally centrally of the insert 60 and extending therethrough. Further, the bushing 22 is retained with respect to the insert 60 against axial movement by lip portions 74 on the insert overlapping the ends of the bushing. It should also be noted that bushing 22 could be now rotatably secured within the bore 72 by providing a plurality of circumferentially spaced, axially extending grooves or recesses (not shown) in the outer periphery thereof. Thus, the sheave half 12, in view of the rotatable engagement with the hub portion 18, is rotatable with respect to the sheave half 14, in view of the latter's non-rotatable engagement with the bushing 22 and the rotatable relationship between the bushing 22 and the hub portion 18. And, in addition to the rotatable relationship between the sheave halves 12 and 14, the same are axially moveable with respect to one another, in view of the mutual cooperative engagement between the threaded portions 46 and 68, respectively.

It is believed that the pulley apparatus 10 has been described thus far in such a manner as to present a clear understanding to those skilled in the art. Accordingly, further description thereof is not deemed necessary, especially since the said apparatus, as described thus far, is disclosed in detail in the aforementioned application Serial No. 307,983, filed September 10, 1963, now Patent No. 3,196,702, issued July 27, 1965. Therefore, should an even clearer and more detailed understanding of the apparatus 10 be desired, to the extent described above, reference can be had thereto.

In the operation of the apparatus 10, as will be more fully described hereinafter, the inserts 38 and 60 together comprise compensating means for unusually efficiently automatically compensating for lengthening of a belt-type driving means 70, said compensating means comprising a plurality of molded inserts that are so constituted and arranged as to be threadably rotatably mutually cooperatively engageable with one another. In certain applications of the apparatus 10, it may well be desirable to releasably substantially permanently maintain or retain the same in its compensated position. To this end, there is provided clutch means 80 for releasably substantially permanently maintaining said compensating means in any one of a substantially infinite plurality of compensated positions.

The clutch means 80 comprises a generally annularly configured plate 82, fabricated of any suitable material, and in any suitable manner, said plate being disposed axially medially of the sheave halves and fixedly structurally operatively associated with the sheave half 14, in any suitable manner, as by means of welding, riveting, or any other suitable securing means. The plate 82 completely annularly encompasses the insert 38 and is provided with a plurality of recesses or grooves 84 substantially equally annularly spaced about the periphery of the plate, within each of which there is fixedly structurally operatively associated, in any suitable manner, a resilient clutch finger 86, of generally hairpin configuration.

Each clutch finger 86 comprises a base 88 that is fixedly structurally operatively associated, in any suitable manner, with one wall 90 of a corresponding one of the grooves 84, enabling each of the clutch fingers 86 to extend generally radially outwardly of the plate 82 in generally perpendicular relationship with respect thereto. Additionally, the fingers 86 comprise a plurality of resilient legs 92 and 94 integrally structurally operatively associated with one another, one of which, and as illustrated, the leg 92, is integrally structurally operatively associated with the base 88 by a bight or bight portion 96. The legs 92 and 94 are angularly disposed with respect to one another, and one of the legs, namely, the leg 94, is of greater longitudinal dimensional extent that the other leg, enabling the former to be disposed in frictional peripheral mutual cooperative engagement with the periphery of the insert 38. The apex defined by the angular relationship between the legs 92 and 94 furthermore presents an abutting ridge 98 extending generally transversely of each of the clutch fingers 86, which ridge is particularly adapted to abuttingly mutually cooperatively engage the base 88.

As will be described more fully hereinafter, the clutch means 80, in accordance with the above construction, is particularly adapted to be continuously mutually cooperatively engageable with the periphery of the insert 38, enabling the said insert to rotatably move relative to the insert 60 in one of a plurality of directions only, and to be precluded from rotational movement in another of said plurality of directions. It may be desirable, however, to release the compensating means, comprising the inserts 38 and 60, from their compensated position, such as for repair and/or replacement of any one or more of the various component parts of the apparatus 10, and/or the drive means 70. To this end, the sheave half 14 is provided with a plurality of apertures 100 equally annularly spaced thereabout, and disposed substantially adjacent and generally in alignment with a corresponding one of the recesses 84. A flange 102 is integrally structurally operative associated with the legs 92 and 94 of the clutch fingers 86, and extends laterally thereof, and through the apertures 100. The flanges 102 are particularly adapted to be engaged by any suitable manual or automatic operating means (not shown), enabling the leg 94 of the clutch fingers to be released from continuous frictional mutual cooperative engagement with the periphery of the insert 38. Once the clutch means 80 is thus released, as by means of pressure upon the flanges 102, or even by pressure applied between the base 88 and the abutting ridge 98, the sheave halves 12 and 14 can be rotatably moved, enabling the axial separation thereof, further enabling and facilitating removal, repair, and/or replacement of any of the component parts of the apparatus 10.

In the operation thereof, loss or lack of tension in the drive means 70 is induced due to the lengthening thereof during periods of extended usage. This loss of tension produces slack in the said drive means which, in turn, results in slippage of the drive means across the surface of the sheave half 12. Slippage between the drive means 70 and the sheave half 12 occurs since the frictional force therebetween is overcome by the non-rotatable relationship between the sheave half 12 and the shaft 26 by means of the hub portion 18. However, the sheave half 14 is rotatable with respect to the shaft 26, by means of the bushing 22, and the frictional force between the drive means 70 and the sheave half 14 precludes slippage therebetween. Movement of the sheave half 14 with the drive means 70, and the mutual cooperative engagement of the threaded portions 46 and 68 causes relative rotation between the sheave halves, and axial compensating movement thereof in a direction towards one another. The effective diameter of the apparatus 10 is thus increased maintaining proper tension in the drive means 70 by unusually efficiently eliminating any slack therein.

Moreover, with particular reference to FIGURE 3, once the sheave halves 12, 14 have axially relatively moved in one direction to a compensated position, they are precluded from moving in another direction from such compensated position. Thus, since the clutch means 80, and particularly the legs 94 thereof, are in continuous frictional mutual cooperative engagement with the periphery of the insert 38, and since the ridge 98 is in continuous abutting engagement with the base 88, the sheave half 12, with which the insert 38 is structurally operatively associated, can only rotate in one of a plurality of directions. The sheave half 12 is, however, precluded from rotational movement in another of said plurality of directions. Of course, this is particularly true since the clutch means 80 is resilient. This must at least be true of the leg 94.

With continuing reference to that figure, it can be seen that the insert 38, and thus the sheave half 12, is rotatably moveable in a generally clockwise direction, since the leg 94 merely rides upon the periphery of the insert. However, the said insert and, thus, the said sheave half, is precluded from rotatably moving in a generally counter-clockwise direction, since the leg 94 is disposed in frictional clutching engagement with the periphery of the said insert.

It is to be understood, at this point, that the clutching fingers 86 can be structurally operatively associated with the sheave 14 in any suitable manner other than by means of the plate 82. It is only necessary that the clutching fingers be disposed substantially perpendicularly with respect to the periphery of the insert 38, and in continuous frictional mutual cooperative engagement therewith.

Moreover, as pointed out above, should it be desired to axially relatively move the sheave halves 12 and 14 and separate the same, for purposes of repair and/or replacement, the clutching means 80 is easily released due to the provision of the flanges 102.

Still further, while the clutching means 80 has been disclosed as structurally coacting with a particular pulley apparatus 10, it will be understood that the clutching means can be disposed to structurally coact with any suitable pulley apparatus.

While the invention has been shown, illustrated, described and disclosed in terms of an embodiment or modification which it has assumed in practice, the scope of the invention should not be deemed to be limited by the precise embodiment or modification herein shown, illustrated, described and disclosed, such other embodiments or modifications intended to be reserved especially as they fall within the scope of the claims here appended.

What is claimed is:

1. Self-compensating torque transmitting pulley apparatus having compensating means for automatically compensating for lengthening of belt-type driving means, said compensating means comprising a plurality of inserts fabricated of a plasticized substance, each of which is moldingly incorporated with a corresponding one of a plurality of sheave halves, said inserts being so constituted and arranged as to be threadably rotatably mutually cooperatively engageable with one another, the improvement comprising, in combination:

clutch means for releasably substantially permanently maintaining said compensating means in any one of a substantially infinite plurality of compensated positions, said clutch means comprising:

a plate of generally annular configuration disposed to completely annularly encompass one of said plurality of inserts;

said plate being fixedly structurally connected to at least one of said plurality of sheave halves, and being disposed axially generally medially thereof, said plate comprising:

a plurality of grooves equally annularly spaced about the periphery thereof;

a plurality of clutch fingers structurally disposed in said grooves, said clutch fingers comprising:

a base disposed fixedly in one wall of a corresponding one of said plurality of grooves, enabling said fingers to extend generally radially outwardly of said annular plate in generally perpendicular relationship with respect thereto;

a plurality of legs integral with one another;

at least one of said legs being inherently resilient and being of greater longitudinal dimensional extent than the other of said legs, enabling said one leg to be disposed in continuous frictional mutual cooperative engagement with the periphery of one of said plurality of inserts;

another of said legs being integral with said base;

said legs being disposed in angular relationship with respect to one another defining an abutting ridge at the apex thereof extending generally transversely of each of said clutch fingers;

said abutting ridge being particularly adapted to be disposed in abutting mutual cooperative engagement with said base, enabling said one insert to be rotatably moveable relative to another of said plurality of inserts in one of a plurality of directions only, and to be precluded from rotational movement in another of said plurality of directions; and a flange integral with at least one of said legs and extending laterally therefrom;

each said flange being particularly adapted to extend within and through a corresponding one of a plurality of apertures in said one sheave half and outwardly thereof;

said apertures being disposed generally in alignment with said grooves and corresponding generally in number thereto; enabling said inserts to be rotatably moveable relative to one another in said other of said plurality of directions.

2. Self-compensating torque transmitting pulley apparatus having compensating means for automatically compensating for lengthening of belt-type driving means, said compensating means comprising a plurality of inserts so constituted and arranged as to be threadably rotatably mutually cooperatively engageable with one another, the improvement comprising, in combination:

clutch means for releasably substantially permanently maintaining said compensating means in any one of a substantially infinite plurality of compensated positions.

3. Self-compensating pulley apparatus as defined in claim 1, wherein:

said clutch means comprises:

a plurality of clutch fingers, each of which is disposed to extend generally radially outwardly from the periphery of one of said plurality of inserts;

said clutch fingers being so constituted and arranged as to be inherently resiliently continuously frictionally mutually cooperatively engageable with the said periphery, enabling said one insert to be rotatably moveable relative to an other of said plurality of inserts in one of a plurality of directions only, and to be precluded from rotational movement in another of said plurality of directions.

4. Self-compensating pulley apparatus as defined in claim 3, wherein:

said clutch fingers comprise:

a base, a plurality of legs interconnected with one another;

at least one of said legs being inherently resilient and being of greater longitudinal dimensional extent than another of said legs, enabling said one leg to be disposed in continuous frictional mutual cooperative engagement with the said periphery of said one insert.

5. Self-compensating pulley apparatus as defined in claim 4, wherein:

said legs are disposed in angular relationship with respect to one another defining an abutting ridge at the apex thereof extending generally transversely of each of said clutch fingers;

said abutting ridge being particularly adapted to be disposed in abutting mutual cooperative engagement with said base, enabling said one insert to be rotatably moveable relative to said other insert in said one of said pluraltiy of directions only, and to be precluded from rotational movement in said other of said plurality of directions.

6. Self-compensating pulley apparatus as defined in claim 5, wherein:
said clutch fingers further comprise:
a flange interconnected with at least one of said legs and extending laterally therefrom, releasably enabling said plurality of inserts to be rotatably moveable relative to one another in said other of said plurality of directions.

7. Self-compensating torque transmitting pulley apparatus having compensating means for automatically compensating for lengthening of belt-type driving means, said compensating means comprising a plurality of sheave halves, and a plurality of inserts integral therewith, said inserts being so constituted and arranged as to be threadably rotatably mutually cooperatively engageable with one another, the improvement comprising, in combination:
clutch means for releasably substantially permanently maintaining said compensating means in any one of a substantially infinite plurality of compensated positions, said clutch means comprising:
a plurality of clutch fingers, each of which is disposed to extend generally radially outwardly from the periphery of one of said plurality of inserts in substantially perpendicular relationship with respect thereto;
said clutch fingers being so constituted and arranged as to be inherently resiliently continuously frictionally mutually cooperatively engageable with the said periphery, enabling said one insert to be rotatably moveable relative to another of said plurality of inserts in one of a plurality of directions only, and to be precluded from rotational movement in another of said plurality of directions.

8. Self-compensating pulley apparatus as defined in claim 7, wherein:
said clutch means is disposed to annularly encompass said plurality of inserts, and is positioned generally medially of said sheaves halves.

9. Self-compensating pulley apparatus as defined in claim 8, wherein:
said clutch fingers comprise:
a base,
a plurality of legs interconnected with one another;
at least one of said legs being inherently resilient and being of greater longitudinal dimensional extent than another of said legs, enabling said one leg to be disposed in continuous frictional mutual cooperative engagement with the said periphery of said one insert.

10. Self-compensating pulley apparatus as defined in claim 9, wherein:
said legs are disposed in angular relationship with respect to one another defining an abutting ridge at the apex thereof extending generally transversely of each of said clutch fingers;
said abutting ridge being particularly adapted to be disposed in abutting mutual cooperative engagement with said base, enabling said one insert to be rotatably moveable relative to said other insert in said one of said plurality of directions only, and to be precluded from rotational movement in said other of said plurality of directions.

11. Self-compensating pulley apparatus as defined in claim 10, wherein:
said clutch fingers further comprise:
a flange interconnected with at least one of said legs and extending laterally therefrom, releasably enabling said plurality of inserts to be rotatably moveable relative to one another in said other of said plurality of directions.

12. Self-compensating torque transmitting pulley apparatus having compensating means for automatically compensating for lengthening of belt-type driving means, said compensating means comprising a plurality of sheave halves, and a plurality of inserts incorporated therewith, said inserts being so constituted and arranged as to be threadably rotatably mutually cooperatively engageable with one another, the improvement comprising, in combination:
clutch means disposed to annularly encompass said plurality of inserts and positioned generally medially of said sheave halves for releasably substantially permanently maintaining said compensating means in any one of a substantially infinite plurality of compensated positions, said clutch comprising:
a plurality of clutch fingers, each of which is disposed to extend generally radially outwardly from the periphery of one of said plurality of inserts, said clutch fingers comprising:
a base,
a plurality of legs interconnected with one another;
at least one of said legs being inherently resilient and being of greater longitudinal dimensional extent than another of said legs, enabling said one leg to be disposed in continuous frictional mutual cooperative engagement with the said periphery of said one insert;
said legs being disposed in angular relationship with respect to one another defining an abutting ridge at the apex thereof extending generally transversely of each of said clutch fingers;
said abutting ridge being particularly adapted to be disposed in abutting mutual cooperative engagement with said base, enabling said one insert to be rotatably moveable relative to said other insert in said one of said plurality of directions only, and to be precluded from rotational movement in said other of said plurality of directions; and
a flange interconnected with at least one of said legs and extending laterally therefrom, releasably enabling said plurality of inserts to be rotatably moveable relative to one another in said other of said plurality of directions.

13. Clutch means particularly adapted for use with self-compensating torque transmitting pulley apparatus having compensating means for automatically compensating for lengthening of belt-type driving means, said clutch means comprising:
a plurality of clutch fingers, each of which is particularly adapted to be disposed to extend generally radially outwardly from the periphery of said compensating means;
said clutch fingers being so constituted and arranged as to be particularly adapted to be inherently resiliently continuously frictionally mutually cooperatively engageable with the said periphery, enabling said compensating means to compensate for lengthening of said belt-type driving means, and to releasably preclude said compensating means from becoming dislodged from any one of a substantially infinite plurality of compensated positions.

14. Clutch means as defined in claim 13, wherein:
said clutch fingers comprise:
a base,
a plurality of legs interconnected with one another;
at least one of said legs being inherently resilient and being of greater longitudinal dimensional extent than another of said legs, enabling said one leg to be disposed in continuous frictional mutual cooperative engagement with said compensating means.

15. Clutch means as defined in claim 14, wherein:
said legs are disposed in angular relationship with respect to one another defining an abutting ridge at the apex thereof extending generally transversely of each of said clutch fingers;

said abutting ridge being particularly adapted to be disposed in abutting mutual cooperative engagement with said base, enabling said compensating means to be releasably substantially permanently maintained in any one of said substantially infinite plurality of compensated positions.

16. Clutch means as defined in claim 15, wherein:
said clutch fingers comprise:
 a flange interconnected with at least one of said legs and extending laterally therefrom, releasably enabling said compensating means to be moved from any one of said substantially infinite plurality of compensated positions.

References Cited by the Examiner
UNITED STATES PATENTS

| | | | |
|---|---|---|---|
| 1,145,991 | 7/1915 | Holmes | 151—25 |
| 1,376,667 | 5/1921 | Benjamin | 151—25 |
| 1,778,368 | 10/1930 | Monnier | 151—25 |

DAVID J. WILLIAMOWSKY, *Primary Examiner.*

L. H. GERIN, *Assistant Examiner.*